INVERSE SQUARE LAW TEACHING APPARATUS
Filed Nov. 30, 1959
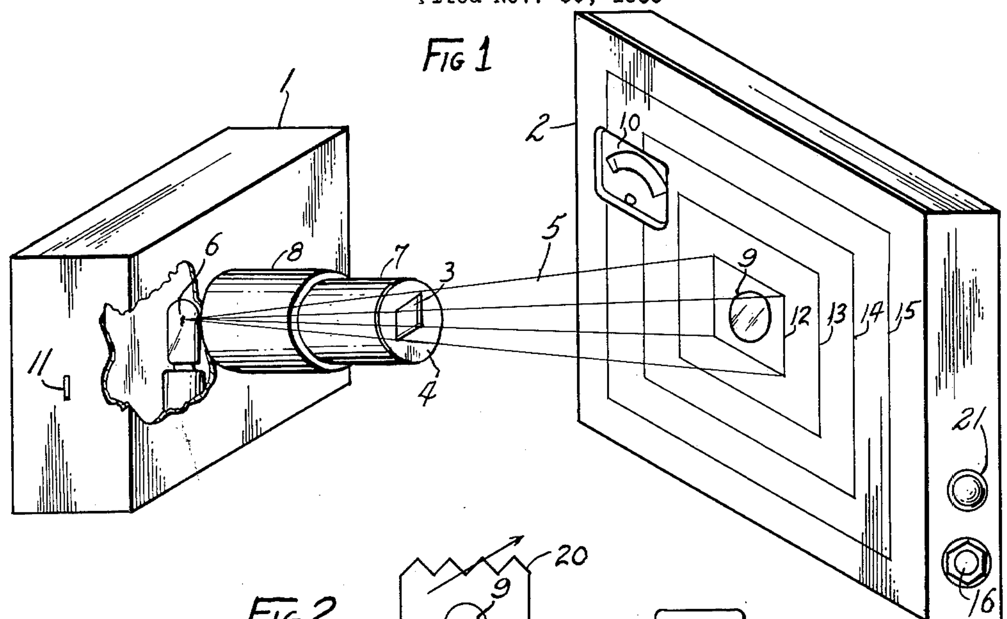
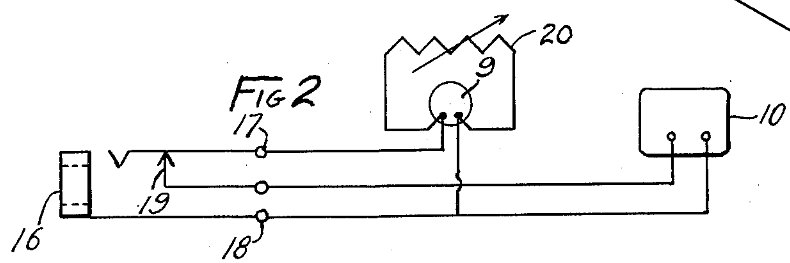
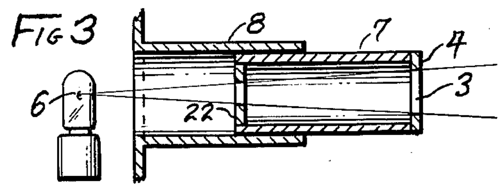
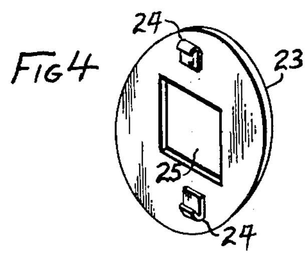
INVENTOR.

United States Patent Office 3,056,216
Patented Oct. 2, 1962

3,056,216

INVERSE SQUARE LAW TEACHING APPARATUS

Joseph Singerman, New York, N.Y.
(110—45 71st Road, Forest Hills 75, N.Y.)

Filed Nov. 30, 1959, Ser. No. 856,178
5 Claims. (Cl. 35—19)

My invention relates to teaching the inverse relation of illuminance to the square of the distance from a point source of light. For practical purposes, or a close approximation, a light area any linear dimension of which, perpendicular to the direction of propagation, is very small relative to the distance under consideration, may be considered as a point source. Reference, hereinafter, to the light source, or the source, will be based on this practical approximation.

A pyramid of light from the source, comprising a definite value of light flux, illuminates a screen. As the instructor increases the source to screen distance, the area illuminated increases with the square of the distance. The readings of a galvanometer, which is connected to a photocell mounted on the screen, shows that the illuminance varies inversely with the area illuminated, or inversely with the square of the distance from the source. While reference hereinafter refers to a self generating type of photocell, obviously any type of photoelectric cell may be used, with or without amplification.

It is one object of my invention to facilitate the simultaneous learning of both the inverse square law and the geometric basis for rationalization of the inverse square relation.

A further object of my invention is to provide the instructor with a demonstration apparatus which requires a minimum of effort and time for setting up or for transporting from one classroom to another.

A still further object of my invention is to provide an apparatus which requires a minimum of manipulation on the part of the instructor.

It is also an object of my invention to make it possible for the instructor to use any one of a wide range of galvanometers which may happen to be available to him. Thus, for example, he may wish to use one of the well-known lecturetable galvanometers which are made large enough for visibility from any seat in a classroom.

A still further object of my invention is to make it possible to obtain, at the shortest source to screen distance being used in the particular demonstration lesson, a large or full scale deflection of the galvanometer. This is a decided advantage in view of the fact that the readings drop with the square of the distance, and small deflections are less accurate and more difficult to read.

An additional object of my invention is to provide a compact set-up to avoid distraction, on the part of the students, brought about by a complexity of units.

Among the devices of the prior art, none combine all the features in one coordinated apparatus. One such device is simply a wire frame showing the geometry involved. Another method calls for holding or clamping a card, with a square aperture, in the path of light falling upon a screen. Another device involves the use of a standard light intensity meter to observe the relation of illuminance to distance.

One embodiment of my invention is illustrated in the accompanying drawings, in which:

FIGURE 1 shows the lamphouse and the screen, in their relative positions in actual use.

FIGURE 2 illustrates a schematic circuit diagram in which a jack is provided for the optional connection of an external galvanometer; and a shunt of variable resistance is used to adapt the photocell output to the characteristics of the particular galvanometer being used.

FIGURE 3 shows the relation of source to aperture, with a baffle to reduce light extraneous to the desired geometric cone.

FIGURE 4 depicts a removable mask.

Referring more specifically to the drawings, FIG. 1 shows the relative positions of lamphouse 1 and screen 2, as they would be positioned on the demonstration table before a class. Due to the square aperture 3 in the mask 4, a pyramid of light 5 of square cross section, the apex of which is at the incandescent filament source 6, illuminates a square shaped area on the screen 2.

The lamphouse and the screen are each mounted on an individual support (not shown) so that they can be aligned in such positions, relative to each other, that the illuminated area is desirably located on the screen. The collimator tube 7, which carries the aperture 3, has a sliding fit within the barrel 8. If the collimator is pushed farther into the barrel, thereby bringing the aperture closer to the source 6, relative to the distance to the screen, the illuminated area is increased in size without affecting the illuminance.

The photocell 9, mounted in the face of the screen, and energized by the incident light, generates an electric current that flows through the galvanometer 10. The amount of current generated and, therefore, the galvanometer reading, is affected by the illuminance. The illuminance, and therefore the galvanometer reading, may be increased by bringing the screen closer to the source, and vice versa.

After having aligned the lamphouse and screen, as indicated above, the instructor will position the two at such a relatively short distance from each other that the galvanometer index is at its maximum or at a desirably large scale reading. This will be noted as the initial illuminance. The distance of source to screen will be measured and noted as the initial distance.

A small opening 11 in the lamphouse, diffusely illuminated by light from the source, is located in a position contiguous with that of the source. To determine source to screen distance, in the darkened classroom, the instructor measures the distance from this opening to the screen.

The collimator tube 7, which carries the mask 4, having aperture 3, has a sliding fit within the barrel 8. Sliding the collimator more or less into the barrel varies the solid angle of the pyramid of light and, therefore, enables the instructor to illuminate, on the screen, a square area of desired dimension, such as the square 12, drawn or printed on the face of the screen.

The instructor may then proceed to increase the source to screen distance, preferably by integral multiples of the initial distance. The illuminance represented by the respective meter readings will be observed to diminish with the square of the distance. Concomitantly, the students will observe that the area illuminated by the pyramid of light increases directly with the square of the distance. For convenience, the screen is ruled off in a series of squares 13, 14, 15, concentric with area 12, and whose respective sides are integral multiples of the length of the side of area 12. Thus, using a given pyramid, or flux, of light, the relations of the illuminance to both the area illuminated and the distance from the source, ordinarily difficult and abstract concepts to the immature student, become strikingly obvious to him.

Mounted on the screen assembly 2 is a phone type, closed circuit, jack 16. A phone plug, connected to an external galvanometer (not shown) when inserted into this jack, will connect that galvanometer, thru the external contacts 17, 18 to the photocell 9. The electric circuit is shown in FIG. 2. The galvanometer is connected to the internal contacts 18 and 19. Contact 18, in this form of jack, is common to both the internal and external circuits. When a phone plug is inserted into jack 16, the separable contact 19 is caused to open, thereby automatically disconnecting the galvanometer 10 from the photocell. In this way, the instructor may use another galvanometer, in accordance with his preference, in place of the one mounted on the screen.

It is, obviously, highly desirable that the meter reading be reasonably proportional to the illuminance. However, commercially available photocells of the self generating kind, deviate appreciably from this type of output when the load resistance is increased, unless the current is very low. With lower load resistance, the output is linear over a wider range. Many galvanometers have a high resistance. When connected directly to the photocell, the current and, therefore, the deflection of the meter index will deviate appreciably from linear proportionality to the illuminance, except for very low values of current. In order to insure a desirable degree of linearity, a conductor 20 of low resistance is shunted to the photocell.

The reading of the galvanometer, which is connected to the thus shunted photocell, will be proportional to the voltage drop across the shunt. But, over a wide range, the current in the shunt will be linear relative to illuminance. Thus, the voltage drop, and, therefore, the meter reading will be linear. Allusion to high and low resistance, in this explanation, is, of necessity, relative. This is due to the fact that the range of the linear portion of the output characteristic, of the type of photocell alluded to, is extended with decreasing load resistance.

In order to insure a sufficiently low load resistance with any one of a wide range of galvanometers, which fall within a broad range of sensitivity and of resistance, the shunt resistor 20 is shown in the form of a rheostat, connected in parallel with the photocell. It thus serves as a variable shunt. It is controlled by the knob 21, shown on the screen assembly in FIG. 1.

FIGURE 3, in which the barrel 8 and collimator 7 are shown in cross-section and also in relation to light source 6, shows the use of a baffle 22 to intercept unwanted radiation. Such unwanted radiation, which would produce an exaggerated penumbra around the border of the illuminated area on the screen, as well as erroneous galvanometer readings, results from light diffusely reflected from the inside rear surface of the lamphouse and from the inner surfaces of the barrel 8 and collimator 7. The baffle 22 reduces such unwanted radiation to a minimum.

It would obviously not alter the function of the collimator 7 if it were not constructed integrally with mask 4. In that event, a removeable mask 23, shown in FIGURE 4, may be inserted at will. It is provided with elastic projections 24, 24 whose sliding friction upon the inner surface of the collimator serves to retain it in position when inserted therein. The advantage of a removeable mask lies in the possibility of providing a set of interchangeable masks, each having a differently sized aperature 25. The demonstrator may select one of the available masks for a particular demonstration lesson. This would serve to give him a still wider degree of freedom in selecting, in advance of the lesson, the relative distances of source to mask and source to screen which he prefers, in order to illuminate a given area on the screen.

While I have described specific embodiments of my invention, it is obvious that various modifications thereof may be made, therein, without departing from my invention. For instance—

The adjustable collimator, used to vary the source to mask distance, may be constructed in more than two sections to provide a greater range of adjustment. Another modification to accomplish this purpose would involve the provision of a number of interchangeable collimators, differing in length. And further—

Obviously, other well-known mechanical means, such as slots or tracks, may be used to retain the removable mask upon the end of the collimator. And further—

The collimator may be fixed in length, leaving adjustment to that provided by a variable photocell shunt, interchangeable masks, or by a means for varying the light intensity. The latter may be accomplished with a variable series resistance, or a variable voltage transformer or battery. And further—

The source may be an electric arc, or any luminous area of sufficiently small dimension, as well as a concentrated incandescent filament. And further—

The screen need not be ruled in advance of the demonstration. The source to screen distances used in the demonstration, and therefore the areas to be illuminated, need not relate to each other in the proportion of simple integers. The surface of a wall may serve as a screen. And further—

A non-variable shunt, or a number of interchangeable shunts may be substituted for the variable shunt described. The shunt may be either integrally mounted with part of the apparatus, as described, or it may be applied as a separate unit. And further—

The galvanometer may be calibrated in illuminance units, such as foot candles. And further—

Obviouly, it would not deviate from this invention to provide electrical connection for utilizing only a galvanometer positioned externally from the screen. And further—

The function of the small aperture 11 in the lamphouse may be served by a mark on a window, similarly located, and likewise illuminated by diffuse light from the source. And further—

Means for connecting an external galvanometer need not necessarily incorporate provision for disconnecting the panel meter. In that case, the latter will simply act as a shunt, or an additional shunt, to the external meter. And further—

The screen may be made of translucent material to enable a student to observe the illuminated area from either side, depending on his location in the classroom relative to the position of the apparatus. And further—

While one type of closed circuit jack is depicted herein, it is obvious that modified types would serve the same purpose. For example, another type of closed circuit jack does not have a common external-internal contact, such as 18 in FIG. 2, but has two entirely separate pairs of contacts. The insertion of the proper plug in the latter type causes the two pair of contact points to separate. Either form of closed circuit jack, when the proper plug is inserted, acts like a double throw switch.

I claim:

1. An inverse square law demonstration apparatus comprising an assembly of a source, a mask and a screen, the latter being located at a variable distance from the source; said mask being positioned between the source and the screen, said screen bearing a photocell, the leads of said photocell being connected respectively to each of the external contacts of a closed circuit jack; the internal contacts of said jack being connected respectively to each of the terminals of a galvanometer.

2. An inverse square law demonstration apparatus comprising an assembly of a source, a mask and a screen, the latter being located at a variable distance from the source, said mask being positioned between the source and the screen, said screen bearing a photocell which is connected in parallel with a shunt; the leads of said photocell being connected respectively to each of the external contacts of a closed circuit jack; the internal contacts of said jack being connected respectively to each of the terminals of a galvanometer.

3. An apparatus as claimed in claim 2, but in which the shunt is in the form of a variable resistance.

4. An inverse square law demonstration apparatus comprising an assembly of a source, a mask and a screen, the latter being located at a variable distance from the source, said mask being positioned between the source and the screen; and in which, affixed between the source and the mask, is a baffle having an aperture of such sige as to reduce the passage of radiation other than that which, essentially, forms a geometric pyramid whose apex is located at the source.

5. A lamphouse, in an inverse square law demonstration apparatus, having a small marker aperture, diffusely illuminated by the light source, located contiguously with the source.

References Cited in the file of this patent

UNITED STATES PATENTS

| | | |
|---|---|---|
| 1,456,150 | Ricker | May 22, 1923 |
| 2,308,095 | Meeder | Jan. 12, 1943 |
| 2,843,007 | Galey et al. | July 15, 1958 |

OTHER REFERENCES

Textbook: "Light" (Nature Series), by Mayer et al., published by: Macmillan (London) in 1878; pages 19 to 25 inclusive.

Textbook: Optics and Service Instruments (no author), Chemical Publishing Co., Inc., 1941 (first American edition) (Doray Press, New York, N.Y.), pages 10 and 11.